Figure 1:
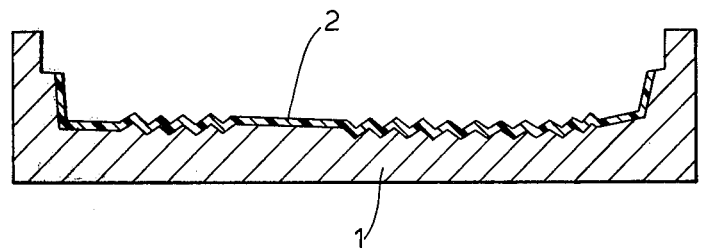

United States Patent [19]

Namba et al.

[11] 4,151,661
[45] May 1, 1979

[54] SHOE SOLES AND METHOD FOR MANUFACTURING THE SAME

[75] Inventors: Junji Namba, Suita; Shizuo Kageyama, Akashi, both of Japan

[73] Assignee: Nihon Soflan Chemical & Engineering Co. Ltd., Osaka, Japan

[21] Appl. No.: 834,303

[22] Filed: Sep. 19, 1977

[30] Foreign Application Priority Data

Sep. 27, 1976 [JP] Japan .................. 51-116948

[51] Int. Cl.$^2$ .................. A43B 13/12; A43B 13/04; A43D 0/00
[52] U.S. Cl. .................. 36/30 R; 36/32 R; 12/146 B
[58] Field of Search .................. 36/30 R, 30 A, 32 R; 12/142 R, 146 B

[56] References Cited

U.S. PATENT DOCUMENTS

| 3,596,381 | 8/1971 | Fukuoka | 36/32 R |
| 4,020,569 | 5/1977 | Fukuoka | 36/30 R |

Primary Examiner—Patrick D. Lawson
Attorney, Agent, or Firm—Blanchard, Flynn, Thiel, Boutell & Tanis

[57] ABSTRACT

A method of manufacturing non-yellowing polyurethane shoe soles which comprises coating a non-yellowing polyurethane composition on the inner surface of a mould for shaping soles, subsequently casting a foamable polyurethane composition into the mould, and curing the compositions, whereby a non-yellowing polyurethane outer layer and a foamed polyurethane sole base are formed and integrally united together to give the shoe sole; and non-yellowing shoe soles thus obtained.

6 Claims, 3 Drawing Figures

SHOE SOLES AND METHOD FOR MANUFACTURING THE SAME

This invention relates to shoe soles made of polyurethane and a method of manufacturing the same, and more particularly to shoe soles having a non-yellowing polyurethane outer layer which is integrally united by curing to the foamed polyurethane sole base and which does not peel off therefrom.

Shoe soles made of polyurethane are used for men's shoes, ladies' shoes and various sport shoes. Especially, shoe soles made of foamed polyurethane are lightweight and have a good wear resistance and a superior cushioning property, so that they are widely used in the shoe manufacturing industry. Although shoe soles made of foamed polyurethane have good properties as described above, they are liable to be discoloured, with age, on their surface owing to their poor resistance to ultraviolet rays and they tend to become yellowed particularly when their initial color is white or pale. For the purpose of making such discoloration inconspicuous, shoe manufacturers generally produce dark-colored shoe soles, for example, by incorporating brown or black pigments in the polyurethane, thus avoiding a white or plate color. Such means, however, is not preferred for highly fashionable shoes.

The aforesaid yellowing property of polyurethane is supposed to be ascribable to the aromatic diiosocyanates used as the starting material. There is proposed a further method of preventing the discoloring by adding a non-discoloring agent such as an absorber of ultraviolet rays to polyurethane, but satisfactory effects can be attained.

Furthermore, it is possible to prevent discoloration, with age, of polyurethane articles by using a non-yellowing diisocyanate component mainly comprising aliphatic diisocyanates instead of the aromatic diisocyanates normally used as a starting material of the polyurethane, but this starting material is very expensive and excessive in quality for use in foamed polyurethane shoe soles. In any event, this material is economically disadvantageous and not suitable as a shoe sole material.

Accordingly, there had heretofore been adopted a method of manufacturing shoe soles in which a non-yellowing coating is coated on the surface of foamed polyurethane shoe soles after the shoe soles or shoes were completed in order to prevent discoloration of the surface of the soles, with age. As the non-yellowing coating material there are exemplified one-component systems of highly polymerized polyurethanes, but practical use of these systems is, however, restricted because of the following drawbacks:

(1) The adhesiveness between the surface of said foamed polyurethane shoe soles and the coating film is insufficient since the shoe soles are subjected to a mould-releasing treatment on their surface prior to moulding and curing, (2) consequently, this coating film is usually apt to be thin in thickness, so that it has inferior physical strength with regard to scratching, wear, etc. and further, it is difficult to reform defects such as air voids or pinholes of the surface of said shoe soles, which cause inferior appearances of the soles as products, and (3) a considerably thick coating is required for obtaining a coating film having satisfactory resistance to ultraviolet rays and wear. When such coating treatment is conducted in one step, an inferior appearances results because of non-uniformity of the coating or dripping.

There is further a method of coating repeatedly the above coating material on the sole surface several times. According to this method, however, not only an increased number of process steps are required, but also the irregularity of defective spots remaining in the shoe sole is more promoted with the result being that there can not be obtained products having good appearances and qualities.

In view of the various drawbacks described above, the present inventors have succeeded in improving the productivity and practical manufacture of shoe soles made of polyurethane as well as enhancing the commercial value of them.

A primary object of this invention is to provide non-yellowing shoe soles made of polyurethane which are not discolored with age and have a high commercial value, and which have a non-yellowing polyurethane outer layer integrally united by curing to the foamed polyurethane sole base.

Another object of the invention is to provide a method for manufacturing non-yellowing polyurethane shoe soles having a non-yellowing polyurethane outer layer integrally united to the foamed polyurethane sole base.

A further object of the invention is to provide non-yellowing shoe soles made of foamed polyurethane free of defects in appearance such as flow lines, air voids, and pin-holes, in spite of the complicated design of the bottom. Here, by the term "flow lines" are meant lines or marks which are generated on the surface of sole product because the moulding material begins to partly cure before it stops flowing with the result being that two flow fronts of the moulding material are incompletely united in a part where they meet one another.

Figure 2:
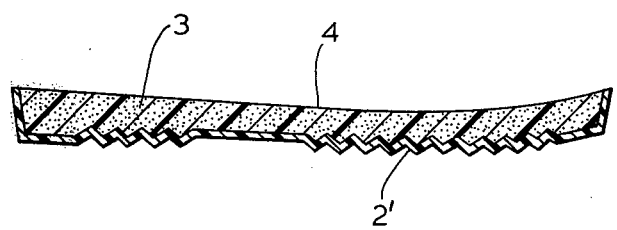
Figure 3:
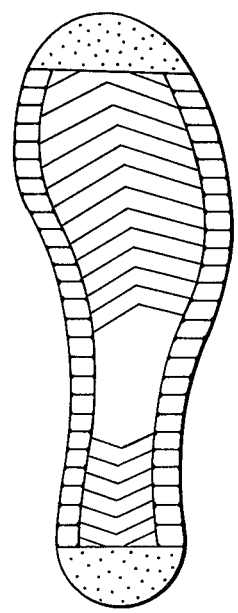

The accompanying drawings show an example of shoe soles and sole moulds for carrying the invention into effect, in which:

FIG. 1 is a cross-sectional view of a mould for manufacturing shoe soles on the surface of which there is formed a non-yellowing polyurethane layer in accordance with this invention, FIG. 2 is a sectional view of a shoe sole according to this invention, and FIG. 3 is a plan view of the bottom design of a mould used for manufacturing shoe soles in the invention.

The polyurethane shoe soles with which this invention is concerned may be manufactured in the following manner. First, a mould-releasing agent is preferably coated inside the mould 1 for shaping soles and is heated. Thereafter, a non-yellowing polyurethane foam solution is coated and dried at room temperature to form a coating layer 2. According to prior art methods, when a coating material is coated on a surface of shoe sole products more than once, the foregoing drawbacks are caused, whereas in this invention the coating process may be conducted once or even several times if necessary without any drawbacks as mentioned above. Then, a foamable polyurethane composition consisting of a prepolymer and a resin liquid is cast into the mould provided above and heated to cure them. Finally, the product is taken out of the mould. There is thus obtained a product in which a foamed polyurethane base 3 and a non-yellowing polyurethane outer layer 2' are united securely.

The said foamable polyurethane composition to be used is a conventional, yellowing type of polyurethane, and preferably it is cast after the solvent of the coating layer 2 was evaporated and more it is cast while the solvent of the coating layer 2 is in a tacky state, i.e. an active state.

Shoe soles obtained in accordance with this invention are made into shoes, for example, by the following steps. That is to say, in the first place, uppers of leather, cloth, etc. are sewed in a predetermined shape and mounted on a shoe last while being stretched. Next, the uppers and sole are bonded together by an adhesive. After drying, the shoe last is taken off to obtain a shoe product.

The polyurethane composition to be used for the manufacture of the sole base according to this invention is one having a yellowing property for general use. This is a so-called two-component system of polyurethane which is usually obtained by reacting an isocyanate-terminated prepolymer liquid and a resin liquid.

The above prepolymer liquid is obtained by reacting mainly a linear polyhydroxy compound having a molecular weight of 500 to 3,000 and an organic diisocyanate in an excess ratio of diisocyanate. The foregoing polyhydroxy compounds include polyetherpolyols, polyesterpolyols and the like. The polyetherpolyol is, for example, obtained by addition polymerization of a diol, e.g. ethylene glycol, propylene glycol or a triol, e.g. glycerine, and an alkylene oxide, e.g. ethylene oxide and propylene oxide, and polyetherpolyols may be used alone or in combination. The polyesterpolyol is generally prepared from a polybasic acid such dicarboxylic acid, e.g. adipic acid, and a hydroxy compound such as a diol or triol, e.g. glycol, glycerine, or prepared also by ring opening polymerization of caprolactone. The aforesaid organic diisocyanate includes, for example, 2,4-tolylene diisocyanate, 2,6-tolylene diisocyanate, 3,3'-dimethyl-4,4'-diphenylmethane diisocyanate and the like and they may be used alone or in combination.

The above resin liquid to be reacted with the prepolymer liquid is a mixture comprising a polyhydroxy compound mentioned above, a hydroxy compound of relatively low molecular weight such as a diol or triol, e,g. 1,4-butylene glycol, ethylene glycol, glycerine, a catalyst, a foaming agent, a foam stabilizer, a pigment, etc. As the catalyst, there may be used a tertiary amine, e.g. triethylenediamine, stannous octoate, dibutyltinlaurate, as the foaming agent, fluorocarbon, water, etc., and as the foam stabilizer, a silicone compound.

The non-yellowing polyurethane composition for forming an outer layer of the shoe soles of the invention is obtained by reacting (a) a polyhydroxy compound having a molecular weight of 500–3,000 as mentioned above and a hydroxy compound of relatively low molecular weight and (b) an organic diisocyanate, e.g. hexamethylene diisocyanate, metaxylene diisocyanate, hydrogenated diphenylmethane diisocyanate, hydrogenated tolylene diisocyanate, isophorone diisocyanate, etc. in an approximately 1:1 equivalent ratio of (a) and (b) and dissolving the resulting product in an organic solvent, e.g. dimethylformamide, methylethyl ketone, toluene, etc. to prepare a solution, in which a catalyst, pigment, etc. may further be incorporated, if necessary to obtain a solvent-type of non-yellowing polyurethane composition. A two-component system of non-yellowing polyurethane composition may also be prepared from a prepolymer that was produced by adjusting appropriately the molar ratio between the aforesaid isocyanate and polyol mixture. Here, any reactant ingredient may be used alone or in combination with each other in the reaction.

The non-yellowing polyurethane composition thus obtained is coated on the inner surface of a sole mould and the solvent is allowed to evaporate (in case of a solvent type) or the composition is cured by a chemical reaction (in case of a two-component system) to form a tough coating layer which has very good resistance to ultraviolet rays, and very good film formability, elongation, tensile strength and wear resistance.

This invention will be further illustrated by the following non-limiting examples.

EXAMPLE 1

(1) Preparation of non-yellowing polyurethane:

| ε-Caprolactone polyester | 1 equivalent | 25% by weight |
|---|---|---|
| 1,4-Butane diol | 2 equivalents | |
| Hydrogenated diphenyl-methane diisocyanate | 3 equivalents | |
| Dibutyl-tin-laurate | | 0.05% by weight |
| Methylethyl ketone | 1:1 mixture | 75% by weight |
| Dimethylformamide | | |

The above ingredients were placed in a 3-necked flask and reacted at 80° C. for 4 hours in a reaction apparatus equipped with a stirrer and a condenser. After the resulting product was confirmed to have no free isocyanate groups and hydroxyl groups, it was cooled to obtain a transparent, viscous solution.

This solution was flowed onto a glass plate coated thinly with silicone grease, the solvent was allowed to evaporate at room temperature, subsequently the coated glass plate was heated at 50° C. for 6 minutes and allowed to stand for 24 hours at room temperature. Thus, a film was obtained having the following physical properties:

| a. Thickness (mm) | 0.05 |
|---|---|
| b. Tensile strength (Kg/cm$^2$) | 250 |
| c. Elongation (%) | 500 |
| d. 100% Modulus (Kg/cm$^2$) | 30 |

(2) Preparation of polyurethane for forming an outer layer of shoe soles:

To 100 parts of the above non-yellowing polyurethane solution was added 5 parts of titan white as a pigment while milling with 3-rollers so that the pigment may be dispersed well in the polyurethane solution. The resulted mixture was diluted with the same amount of a 1:1 mixture solvent of toluol and methylethyl ketone.

EXAMPLE 2

Preparation of foamable polyurethane for sole base:

| A. Prepolymer | |
|---|---|
| Polyester polyol (butylene adipate, molecular weight: 2000) | 100 parts by weight |
| 4,4'-Diphenylmethane diisocyanate | 142.3 parts by weight |

The above ingredients were dissolved by heating, placed in a 3-necked flask and reacted in nitrogen stream at 70° C. for 3 hours while stirring to obtain a prepolymer. After cooling, the free isocyanate group content was measured as being 18.0%.

B. Resin liquid

| | | |
|---|---|---|
| Polyester polyol (butylene adipate, molecular weight: 2000) | 56.7 | parts by weight |
| Polyester polyol (butylene adipate, molecular weight: 1000) | 28.3 | parts by weight |
| 1,4-Butane diol | 15.0 | parts by weight |
| DABCO* | 0.7 | parts by weight |
| Silicone | 1.0 | parts by weight |
| Titan white | 12 | parts by weight |
| Water | 0.3 | parts by weight |

*DABCO is triethylenediamine produced by Houdry Process Co. (USA).

To these polyester polyols which were dissolved by heating, there was added a mixture of 1,4-butane diol and DABCO which was previously mixed and dissolved, and subsequently, titan white and water were added. They were mixed homogeneously to obtain a resin liquid.

The polyurethane for sole base prepared by mix-foaming 100 parts by weight of the above prepolymer and 100 parts of weight of the above resin liquid at a liquid temperature of 50° C. The processing conditions were as follows:

| | |
|---|---|
| Cream time (sec) | 8-10 |
| Rise time (sec) | 30-35 |
| Specific gravity (free) | 0.40 |
| Mould releasing condition | 45° C., 6 minutes |

EXAMPLE 3

Manufacture of shoe soles:

A mould 1 for shaping shoe soles which is made of aluminum alloy and has a design of sole as shown in FIG. 1 was homogeneously coated thinly with a mould-releasing agent of wax series and heated to 40°–45° C. to evaporate the solvent contained in the mould-releasing agent. First, the non-yellowing polyurethane solution obtained in Example 1 was coated on the inner surface of the mould by means of a spray gun in an amount of 20 g/one shoe and dried to form a coating layer 2. Next, the foamable polyurethane liquid for foamed sole base consisting of the prepolymer and resin liquid was cast into the coated mould, foamed and cured by heating at 60° C. for 6 minutes. A product 4 was thus taken off. This product is a shoe sole 4 composed of the foamed polyurethane sole base 3 and the non-yellowing polyurethane outer layer 2' united firmly to the base, and free from defects in both physical properties and appearances.

COMPARISON EXAMPLE 1

Shoe soles of foamed polyurethane were manufactured in a similar manner to Example 3 except that the non-yellowing polyurethane solution of Example 1 is not coated on the inner surface of mould for shaping soles. That is to say, as mentioned in Example 3, after a mould-releasing agent was applied inside the mould, the polyurethane solution of Example 2 was cast into the mould and cured by heating at 60° C. for 6 minutes. The product thus obtained was taken out.

COMPARISON EXAMPLE 2

After the mould-releasing agent attached to the surface of the shoe soles obtained according to Comparison Example 1 was wiped off with a cloth impregnated with methylene chloride, the non-yellowing polyurethane solution of Example 1 was coated on the surface of the sole with a brush and was dried at room temperature.

Ten pairs of shoe soles in each example were manufactured according to Example 3 and Comparison Examples 1 and 2, and compared with each other with regard to their appearances and physical properties in terms of bending flexture test. The results are shown in Table 1 and 2.

Table 1

| | | Example 3 | Comparison Example 1 | Comparison Example 2 |
|---|---|---|---|---|
| Appearances | Pinhole number/ one shoe* | 2-5 | 15-25 | 13-25 |
| | Flow line | none | found | none |
| | Gloss | good | good | bad |
| | Resistance to UV rays** | no change | yellow brown | no change |

*Pinhole number was counted with the naked eye.
**Resistance to UV rays was measured by observing the change in color tone of the specimen irradiated for 100 hours on a weather-o-meter.

Table 2

| Bending flexture test* | Example 3 | | Comparison Example 1 | | Comparison Example 2 | |
|---|---|---|---|---|---|---|
| | Room temp. | −15° C. | Room temp. | −15° C. | Room temp. | −15° C. |
| Peeling test | no peeling | no peeling | — | — | Peeling occurred at 10,000 cycles | peeling occurred at 700 cycles |
| Cracking test | no crack | no crack | — | — | no crack | no crack |

*Bending flexture test was conducted on De Mattia bending flexture tester by bending the specimen each 50,000 cycles at room temperature and 30,000 cycles at −15° C. to examine the peeling and cracking states of the outer layer in Example 3 and the coating film in Example 2.

The above test results are summarized in Table 3.

Table 3

| | Example 3 | Comparison Example 1 | Comparison Example 2 |
|---|---|---|---|
| Appearance | good | bad | bad |
| Resistance to UV rays | good | poor | good |
| Adhesiveness | good | — | poor |

In the shoe soles of Comparison Example 2, in which the coating layer is formed by carefully wiping off the mould-releasing agent and subsequently coating the non-yellowing polyurethane coating material, the interface of the coating layer is clear from eye-observation of the cross-section of the sole product, that is to say, it can be seen that this coating layer is a merely coated one. Even if an appearance irregularity on the surface of the shoe sole with this coating layer, such as an air void, is reformed, the bending flexture test causes this coating layer to undergo earlier peeling and it exhibits poor adhesiveness with the sole surface.

In contrast to this, the shoe sole of this invention is provided with a good appearance and properties as aforementioned and the interface between the polyurethane sole base and the non-yellowing polyurethane outer layer in the cross section of this sole is not clear. However, when this cross section undergoes discoloration test, for example, by ultraviolet rays irradiation, the sole base is discolored, whereas the outer layer is not discolored, so that the interface between the both becomes clear owing to the difference in the color tone of both. Thus, it can be seen, that both are cured in a united and secure fashion in the interface.

The above results show that the shoe soles in Example 3 exhibit superior qualities as compared with those of Comparison Examples 1 and 2 and above all, exhibit remarked durability and good appearance (as seen from Tables 1-3) as compared with those of Comparison Example 2 in which the order of forming the non-yellowing coating film is adverse to the order of forming the non-yellowing outer layer of this invention. Further, the shoe soles and method of manufacturing them pertaining to this invention can contribute greatly to economical improvement in this art owing to the good processability and the decreased rate of rejected goods caused by pinholes, etc.

This invention may be applied not only to the manufacture of polyurethane shoe soles as described above, but also to the manufacture of shoes according to the so-called polyurethane direct soling process. The "polyurethane direct soling process" means a method of manufacturing shoes which comprises sewing an upper such as leather, cloth in a predetermined shape, mounting the upper on a shoe last, setting the last on a mould for shaping soles and subsequently casting a foamable polyurethane solution into the closed cavity between the last and the mould to foam it, whereby the uppers and the foamed polyurethane sole are firmly united integrally. When this invention is applied to the polyurethane direct soling process, the mould is coated with the non-yellowing polyurethane obtained in Example 1 on its inner surface in a similar manner to Example 3. There are thus obtained various kind of shoes made of leather or cloth united firmly to soles having a good appearances and physical properties.

What we claim is:

1. A non-yellowing polyurethane shoe sole, comprising; a non-yellowing polyurethane outer layer forming the lower surface of the shoe sole and a foamed polyurethane sole base integrally united by curing to said outer layer, said sole base having been made by casting directly onto the upper surface of a preformed outer layer a foamable liquid mixture consisting essentially of an isocyanate-terminated prepolymer liquid and a resin liquid containing polyurethane-forming hydroxyl material, a catalyst and a foaming agent, and reacting the ingredients of said mixture to cause same to foam into the shape of said sole base and to cure the foamed polyurethane into a solid state while in contact with said preformed outer layer whereby said foamed sole base is integrally united by curing to said outer layer.

2. A shoe having a non-yellowing polyurethane shoe sole as claimed in claim 1, in which a shoe last having a shoe upper mounted thereon is integrally united to said foam sole base by curing said foamed polyurethane while in contact with said last.

3. A shoe sole according to claim 1 wherein said non-yellowing polyurethane composition is obtained by the reaction of (a) a polyhydroxy compound having a molecular weight of 500 to 3,000 and a low molecular hydroxy compound, with (b) a non-yellowing diisocyanate selected from the group consisting of hexamethylene diisocyanate, metaxylene diisocyanate, hydrogenated diphenylmethane diisocyanate, hydrogenated tolylene diisocyanate and isophorone diisocyanate, in a ratio of (a):(b) of about 1:1 by equivalent.

4. A shoe sole according to claim 1 wherein said non-yellowing polyurethane composition is a two-component system and said foamable polyurethane composition is cast into the mould while the non-yellowing polyurethane layer is tacky in the mould or after the non-yellowing polyurethane layer has been cured.

5. A shoe sole according to claim 1 wherein said non-yellowing polyurethane composition is a solvent composition and said foamable polyurethane composition is cast into the mould after the solvent of the non-yellowing polyurethane layer has been evaporated.

6. A non-yellowing shoe sole according to claim 1, wherein the cross section of the shoe sole has an interface between the foamed polyurethane sole base and the non-yellowing polyurethane outer layer which can be discriminated by a discoloring test using ultraviolet ray irradiation.

* * * * *